US012321838B2

(12) United States Patent
McClean et al.

(10) Patent No.: US 12,321,838 B2
(45) Date of Patent: Jun. 3, 2025

(54) QUANTUM COMPUTING WITH KERNEL METHODS FOR MACHINE LEARNING

(71) Applicant: Google LLC, Mountain View, CA (US)

(72) Inventors: Jarrod Ryan McClean, Marina Del Rey, CA (US); Hsin-Yuan Huang, Pasadena, CA (US)

(73) Assignee: Google LLC, Mountain View, CA (US)

( * ) Notice: Subject to any disclaimer, the term of this patent is extended or adjusted under 35 U.S.C. 154(b) by 898 days.

(21) Appl. No.: 17/505,202

(22) Filed: Oct. 19, 2021

(65) Prior Publication Data

US 2022/0121998 A1 Apr. 21, 2022

Related U.S. Application Data

(60) Provisional application No. 63/093,611, filed on Oct. 19, 2020.

(51) Int. Cl.
*G06N 10/00* (2022.01)
*G06N 20/10* (2019.01)

(52) U.S. Cl.
CPC .......... *G06N 20/10* (2019.01); *G06N 10/00* (2019.01)

(58) Field of Classification Search
CPC .................. G06N 20/10; G06N 10/00
See application file for complete search history.

(56) References Cited

U.S. PATENT DOCUMENTS

| 2018/0096085 | A1 | 4/2018 | Rubin |
| 2019/0378025 | A1 | 12/2019 | Corcoles-Gonzalez et al. |
| 2020/0320437 | A1 | 10/2020 | Gambetta et al. |
| 2022/0058435 | A1* | 2/2022 | Ou .................. G06F 18/2411 |

OTHER PUBLICATIONS

Wiersema et al. "Implementing perceptron models with qubits", 2019, pp. 9, arXiv:1905.06728v2 [quant-ph].*
Arora et al, "On exact computation with an infinitely wide neural net" NIPS, 2019, 10 pages.
Arute et al, "Quantum supremacy using a programmable superconducting processor" Nature, 2019, 7 pages.
Bartkiewicz et al, "Experimental kernel-based quantum machine learning in finite feature space" Scientific Reports, 2020, 9 pages.
Blank et al, "Quantum classifier with tailored quantum kernel" Quantum Information, 2020, 7 pages.

(Continued)

*Primary Examiner* — Li Wu Chang
(74) *Attorney, Agent, or Firm* — Fish & Richardson P.C.

(57) ABSTRACT

Methods, systems, and apparatus for quantum machine learning. In one aspect, a method includes obtaining, by a quantum computing device, a training dataset of quantum data points; computing, by the quantum computing device, a kernel matrix that represents a similarity between the quantum data points included in the training dataset, comprising computing a value of a kernel function for each pair of quantum data points in the training dataset, wherein the kernel function is based on reduced density matrices for the quantum data points; and providing, by the quantum computing device, the kernel matrix to a classical processor, wherein the classical processor performs a training algorithm using the kernel matrix to construct a machine learning model.

24 Claims, 4 Drawing Sheets

(56) References Cited

OTHER PUBLICATIONS

Boixo et al, "Characterizing quantum supremacy in near-term devices" Nature, 2018, 6 pages.
Bravyi et al, "Classical algorithms for quantum mean values" arXiv, 2019, 29 pages.
Breiman, "Random forests" Machine learning, 2001, 28 pages.
Broughton et al, "Tensorflow quantum: A software framework for quantum machine learning" arXiv, 2020, 39 pages.
Buitinck et al, "API design for machine learning software: experiences from the scikit-learn project" ECML PKDD, 2013, 16 pages.
Cade et al, "Strategies for solving the fermi-hubbard model on near-term quantum computers" arXiv, 2019, 25 pages.
Cortes et al, "Support-vector networks" Machine Learning, 1995, 25 pages.
Cotler et al, "Quantum overlapping tomography" Physical Review, 2020, 6 pages.
Farhi et al, "A quantum adiabatic evolution algorithm applied to random instances of an np-complete problem" arXiv, 2001, 15 pages.
Farhi et al, "Classification with quantum neural networks on near term processors" arXiv, 2018, 21 pages.
Grant et al, "An initialization strategy for addressing barren plateaus in parametrized quantum circuits" Quantum, 2019, 9 pages.
Haah et al, "Sample-optimal tomography of quantum states" IEEE, 2017, 14 pages.
Halevy et al, "The unreasonable effectiveness of data" IEEE, 2009, 5 pages.
Havlicek et al, "Supervised learning with quantum enhanced feature spaces" arXiv, 2018, 22 pages.
Hohenberg et al, "Inhomogeneous electron gas" Physical review, 1964, 8 pages.
Huang et al, "Power of data in quantum machine learning" arXiv, 2021, 34 pages.
Huang et al, "Predicting many properties of a quantum system from very few measurements" Nat. Phys. 2020, 9 pages.
Jacot et al, "Neural tangent kernel: Convergence and generalization in neural networks" NIPS, 2018, 10 pages.
LaRose et al, "Robust data encodings for quantum classifiers" Physical Review, 2020, 24 pages.
Lecun et al, "MNIST handwritten digit database" ATT Labs, 2010, 7 pgaes.
Li et al, "Enhanced convolutional neural tangent kernels" arXiv, 2019, 18 pages.
Liu et al., "A rigorous and robust quantum speed-up in supervised machine learning" arXiv, 2020, 27 pages.
McClean et al, "Barren plateaus in quantum neural network training landscapes" Nature, 2018, 6 pages.
McClean et al, "Low depth mechanisms for quantum optimization" arXiv, 2020, 30 pages.
McClean et al, "The theory of variational hybrid quantum-classical algorithms" New Journal of Physics, 2016, 23 pages.
Micchelli et al, "Universal kernels" JMLR, 2006, 32 pages.
Neven et al, "Training a large scale classifier with the quantum adiabatic algorithm" arXiv, 2009, 14 pages.
Nielsen et al, "Quantum computation and quantum information" American Journal of Physics, 2002, 4 pages.
Novak et al, "Neural tangents: Fast and easy infinite neural networks in python" arXiv, 2019, 19 pages.
Paini et al., "An approximate description of quantum states" arXiv, 2019, 16 pages.
PCT International Search Report and Written Opinion in International Appln. No. PCT/US2021/055545, dated Feb. 2022, 18 pages.
Peruzzo et al, "A variational eigenvalue solver on a photonix quantum processor" Nature, 2014, 7 pages.
Rebentrost et al, "Quantum support vector machine for big data classification" Phys. Rev. Lett., 2014, 5 pages.
Rubin, "A hybrid classical/quantum approach for large-scale studies of quantum systems with density matrix embedding theory" arXiv, 2016, 10 pages.
Runge et al, "Density-functional theory for time-dependent systems" Physical Review, 1984, 4 pages.
Schuld et al, "Circuit-centric quantum classifiers" Physical Review, 2020, 8 pages.
Schuld et al, "Quantum machine learning in feature Hilbert spaces" arXiv, 2018, 12 pages.
Skolik et al, "Layerwise learning for quantum neural networks" arXiv, 2020, 11 pages.
Wecker et al, "Progress towards practical quantum variational algorithms" Physical Review, 2015, 10 pages.
Wiersema et al, "Exploring entanglement and optimization within the hamiltonian variational ansatz" arXiv, 2020, 14 pages.
Xiao et al, "Fashion-MNIST: a novel image dataset for benchmarking machine learning algorithms" arXiv, 2017, 6 pages.
Notice of Allowance in Japanese Appln. No. 2023-524185, mailed on May 7, 2024, 5 pages (with English translation).
International Preliminary Report on Patentability in International Appln. No. PCT/US2021/055545, mailed on May 4, 2023, 11 pages.
Office Action in Canada Appln. No. 3,196,122, mailed on Sep. 27, 2024, 6 pages.
Notice of Allowance in Australian Appln. No. 2021364446, mailed on Nov. 29, 2023, 3 pages.
Office Action in Australian Appln. No. 2021364446, mailed on Nov. 10, 2023, 3 pages.
Office Action in Australian Appln. No. 2024201618, mailed on Jan. 13, 2025, 2 pages.
Office Action in Indian Appln. No. 202327027165, mailed on Jan. 13, 2025, 5 pages (with English translation).

* cited by examiner

QUANTUM COMPUTING WITH KERNEL METHODS FOR MACHINE LEARNING

CROSS-REFERENCE TO RELATED APPLICATIONS

This application claims the benefit under 35 U.S.C. § 119(e) of U.S. Patent Application No. 63/093,611, filed Oct. 19, 2020. The disclosure of the foregoing application is incorporated herein by reference in its entirety for all purposes.

BACKGROUND

Kernel methods are a class of algorithms for pattern analysis. The task of pattern analysis is to find and study general types of relations, e.g., clusters, rankings, principal components, correlations, and classifications in datasets. For many algorithms that solve these tasks, the data in raw representation has to be explicitly transformed into feature vector representations via a user-specified feature map. In contrast, kernel methods require only a user-specified kernel—a similarity function (or "kernel function") over pairs of data points in raw representation.

Kernel functions enable kernel methods to operate in a high-dimensional, implicit feature space without computing the coordinates of the data in that space. Instead, inner products between images of all pairs of data in the feature space are computed. These operations are often computationally cheaper than the explicit computation of the coordinates.

Algorithms capable of operating with kernels include the kernel perceptron, support vector machines (SVM), Gaussian processes, principal components analysis (PCA), canonical correlation analysis, ridge regression, spectral clustering, linear adaptive filters and many others. Any linear model can be turned into a non-linear model by applying the kernel trick to the model: replacing its features (predictors) by a kernel function.

SUMMARY

This specification describes techniques for quantum computing with kernel methods for machine learning.

In general, one innovative aspect of the subject matter described in this specification can be implemented in methods that include obtaining, by a quantum computing device, a training dataset of quantum data points; computing, by the quantum computing device, a kernel matrix that represents similarities among the quantum data points included in the training dataset, comprising computing, for each pair of quantum data points in the training dataset, a corresponding value of a kernel function, wherein the kernel function is based on reduced density matrices for the quantum data points; and providing, by the quantum computing device, the kernel matrix to a classical processor.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises receiving, from the quantum computing device and by the classical processor, the kernel matrix; and performing, by the classical processor, a training algorithm using the kernel matrix to construct a machine learning model.

In some implementations the method further comprises obtaining, by the quantum computing device, a validation dataset of quantum data points; computing, by the quantum computing device, new elements of the kernel matrix, wherein the new elements comprise entries representing similarities between the quantum data points in the validation dataset and the quantum data points in the training dataset, wherein computing the new elements comprises computing, for each pair of quantum data points in the training dataset and the validation dataset, corresponding values of the kernel function; and providing, by the quantum computing device, the new elements of the kernel matrix to the classical processor.

In some implementations the method further comprises processing, by the classical processor, the new elements of the kernel matrix to output predictions for each quantum data point in the validation dataset.

In some implementations the kernel function is based on single-body reduced density matrices for the quantum data points in the training dataset.

In some implementations the kernel function comprises a linear kernel function.

In some implementations the linear kernel function i) takes a first quantum data point and second quantum data point as input, ii) produces a numerical output, and iii) includes a sum of terms, wherein the sum runs over each of N-qubits for N>1 and the summand corresponds to a respective qubit and is equal to the trace of a product of a) a reduced density matrix for the first quantum data point on a subsystem corresponding to the respective qubit b) a reduced density matrix for the second quantum data point on a subsystem corresponding to the respective qubit.

In some implementations the linear kernel function is given by $$Q(x_i, x_j) = \sum_l Tr[Tr_{m \neq l}[\rho(x_i)]][Tr_{n \neq l}[\rho(x_j)]]$$

where $x_i$, $x_j$ represent a first and second quantum data point, l represents an index that runs from 1 to the number of qubits N and labels each qubit, $\rho(x_i) = |x_i\rangle\langle x_i|$ and $Tr_{m \neq k}[\rho(x_i)]$ represents a 1-reduced density matrix (RDM) on qubit k.

In some implementations computing a value of the kernel function for a pair of quantum data points in the training dataset, the pair comprising a first N-qubit quantum state worth N>1 and a second N-qubit quantum state with N>1, comprises: repeatedly and for each qubit index: computing a 1-reduced density matrix (RDM) for the first N-qubit quantum state on a subsystem corresponding to qubit l, comprising obtaining a copy of an N-qubit quantum system in the first N-qubit quantum state and measuring each qubit in the quantum system except the l-th qubit to obtain a first reduced quantum state of the quantum system; computing a 1-RDM for the second N-qubit quantum state on a subsystem corresponding to qubit l, comprising obtaining a copy of an N-qubit quantum system in the second N-qubit quantum state and measuring each qubit in the quantum system except the l-th qubit to obtain a second reduced quantum state of the quantum system; determining a trace of the product of the first reduced quantum state and the second reduced quantum state; and summing averages of the determined traces for each qubit index.

In some implementations the kernel function comprises a squared exponential kernel function.

In some implementations the squared exponential kernel function i) takes a first quantum data point and second quantum data point as input, ii) produces a numerical output, and iii) includes an exponential function of a sum of terms, wherein the sum runs over each of N-qubits for N>1 and the summand corresponds to a respective qubit and is equal to norm of a) a reduced density matrix for the first quantum data point on a subsystem corresponding to the respective qubit minus b) a reduced density matrix for the second quantum data point on a subsystem corresponding to the respective qubit.

In some implementations the squared exponential kernel function is given by $$Q_E^1(x_i, x_j) = \exp\left(-\gamma \sum_l \|Tr_{m \neq l}[\rho(x_i)] - Tr_{n \neq l}[\rho(x_j)]\|^2\right)$$

where $x_i$, $x_j$ represent a first and second quantum data point, l represents an index that runs from 1 to the number of qubits N and labels each qubit, $\rho(x_i)=|x_i\rangle\langle x_i|$ and $Tr_{m \neq k}[\rho(x_i)]$ represents a 1-RDM on qubit k.

In some implementations computing a value of the kernel function for a pair of quantum data points in the training dataset, the pair comprising a first N-qubit quantum state with N>1 and a second N-qubit quantum state with N>1, comprises repeatedly and for each qubit index: computing a 1-reduced density matrix (RDM) for the first N-qubit quantum state on a subsystem corresponding to qubit l, comprising obtaining a copy of an N-qubit quantum system in the first N-qubit quantum state and measuring each qubit in the quantum system except the l-th qubit to obtain a first reduced quantum state of the quantum system; computing a 1-RDM for the second N-qubit quantum state on a subsystem corresponding to qubit l, comprising obtaining a copy of an N-qubit quantum system in the second N-qubit quantum state and measuring each qubit in the quantum system except the l-th qubit to obtain a second reduced quantum state of the quantum system; subtracting the second reduced quantum state from the first reduced quantum state to obtain a third reduced quantum state and determining a norm of the third reduced quantum state; and summing averages of the determined norms for each qubit index and computing an exponent of the summed averages.

In some implementations the kernel function is based on k-body RDMs for the quantum data points, wherein k is less than a predetermined value.

In some implementations the kernel function comprises a linear kernel function.

In some implementations the linear kernel function i) takes a first quantum data point and second quantum data point as input, ii) produces a numerical output, and iii) comprises a sum of terms, wherein the sum runs over each subset of k-qubits taken from the N qubits and each summand corresponds to a respective subset and is equal to the trace of a product of a) a reduced density matrix for the first quantum data point on a subsystem corresponding to the respective subset of k qubits and b) a reduced density matrix for the second quantum data point on a subsystem corresponding to the respective subset of k qubits.

In some implementations the linear kernel function is given by $$Q_L^k(x_i, x_j) = \sum_{K \in S_k(n)} Tr[Tr_{m \notin K}[\rho(x_i)]][Tr_{n \notin K}[\rho(x_j)]]$$

where $S_k(n)$ represents a set of subsets of k qubits, $\rho(x_i)=|x_i\rangle\langle x_i|$ and $Tr_{m \neq K}[\rho(x_i)]$ represents a k-RDM.

In some implementations computing a value of the kernel function for a pair of quantum data points in the training dataset, the pair comprising a first N-qubit quantum state and a second N-qubit quantum state, comprises: repeatedly and for each set of k-qubits: computing a k-RDM for the first N-qubit quantum state on a subsystem corresponding to qubits in the set, comprising obtaining a copy of an N-qubit quantum system in the first N-qubit quantum state and measuring each qubit in the quantum system except for the qubits included in the set to obtain a first reduced quantum state of the quantum system; computing a k-RDM for the second N-qubit quantum state on a subsystem corresponding to qubits in the set, comprising obtaining a copy of an N-qubit quantum system in the second N-qubit quantum state and measuring each qubit in the quantum system except for the qubits included in the set to obtain a second reduced quantum state of the quantum system; determining a trace of the product of the first reduced quantum state and the second reduced quantum state; and summing averages of the determined for each set of k qubits.

In some implementations the kernel function comprises an exponential kernel function.

In some implementations the exponential kernel function is given by $$Q_S(x_i, x_j) = \sum_{k=0}^{\infty} \frac{\gamma^k}{k! n^k} Q_l^k(x_i, x_j) = \mathbb{E}\exp\left(\frac{\gamma}{n}\sum_{h=1}^{n}\left(9\delta_{s_h^i s_h^j}\delta_{b_h^i b_h^j} - 4\right)\right)$$

where the expected value $\mathbb{E}$ is taken over $n_s$ samples (i.e., experiments, where $n_s$ is chosen as large as possible whilst taking into account hardware implementation considerations, e.g., $n_s$ is chosen as the largest number that can be afforded to be measured experimentally), from randomly chosen Pauli frames that are measured on a first and second system i and j, $$\delta_{s_h^i s_h^j}$$

represents a first indicator function for an agreement between a random Pauli measurement result performed independently on the first system i and the second system j and $$\delta_{b_h^i b_h^j}$$

represents a second indicator function for a measurement basis agreement.

In some implementations computing a value of the kernel function for a pair of quantum data points in the training dataset, the pair comprising a first N-qubit quantum state and a second N-qubit quantum state, comprises repeatedly: obtaining a first measurement result, comprising measuring each qubit in the first system in a random Pauli basis to obtain values $s_h^i$ and $b_h^i$ for the h-th qubit, wherein $s_h^i$ is either 1 or −1 and $b_h^i$ is a random basis X, Y, or Z; obtaining a second measurement result, comprising measuring each qubit in the second system in a random Pauli basis to obtain values $s_h^j$ and $b_h^j$ for the h-th qubit, wherein $s_h^j$ is either 1 or −1 and $b_h^j$ is a random basis X, Y, or Z; comparing, for the h-th qubit in the N qubit system, the first measurement result and second measurement result to determine a value of the first indicator function, determining, for the h-th qubit in the N qubit system, a value of the second indicator function; and multiplying, summing and averaging the determined values of the first indicator function and the second indicator function.

In some implementations the quantum data points comprise N-qubit quantum states with N>1.

In some implementations obtaining the training dataset of quantum data points comprises: receiving a training dataset of classical data points; and generating the training dataset of quantum data points, comprising embedding each classical data point in a respective quantum state by applying a respective encoding circuit to a reference quantum state.

The subject matter described in this specification can be implemented in particular ways so as to realize one or more of the following advantages.

Kernel methods for machine learning can be applied to a variety of regression and classification problems. However, there are limitations to the successful solution to such problems when the feature space becomes large and the kernel function becomes computationally expensive to estimate. The presently described techniques address this problem by using a quantum computing device to compute the kernel function.

In addition, the presently described quantum computation of the kernel function is scalable—as the number of qubits increases, the signal remains large and the method continues to function well, if not better. This is in contrast to known quantum kernel methods where the signal typically decays exponentially in the number of qubits, e.g., because of a small geometric difference due to an exponentially large Hilbert space where all inputs are too far apart. The scalability of the presently described techniques is achieved by enlarging the geometric difference by projecting quantum states embedded from classical data back to classical space, e.g., through using RDMs. In other words, a kernel function that is close to zero for every two points does not generalize well. However, the presently described projected quantum kernel is defined using an approximate classical representation of the quantum state, and this results in a non-zero kernel function that provides better generalization performance.

Further, due to the enlarged geometric difference, the presently described techniques can achieve a large prediction advantage over common classical machine learning models. Such prediction advantages can also be achieved with a small number of qubits, e.g., up to 30 qubits. Therefore, the presently described techniques are particularly suitable for implementations using small quantum computers, e.g., noisy intermediate scale quantum devices and/or hybrid quantum-classical computers.

The presently described techniques can be applied to various applications of classical machine learning, including examples from quantum machine learning that involve naturally quantum input data, including: image and digit classification such as from MNIST or other sources of image/video data, classification of sentiment and textual analysis, analysis of high energy physics data, classification of data from a quantum sensor into a phase, quantum state discrimination or quantum repeater engineering, prediction using data from quantum sensors, many-body or otherwise.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for performing machine learning tasks using a quantum kernel method.

In conventional quantum kernel methods the kernel operator is based on a fidelity-type metric, e.g., given by $Tr[\rho(x_i)\rho(x_j)]$. This kernel operator can regard all data points to be far from each other and produce a kernel matrix that is close to identity. This can result in a small geometric difference and can lead to classical machine learning models being competitive or outperforming the quantum kernel method. For example, in some cases a quantum model may require an exponential amount of samples to learn using this conventional kernel operator, but only needs a linear number of samples to learn using a classical machine learning model.

The presently described quantum kernel method addresses this problem using a family of projected quantum kernels. A quantum or classical dataset of data points is received and a quantum computer is used to compute the geometry between the data points. The geometry is computed using a projected quantum kernel operator chosen from a family of reduced physical observables that are scalable. The projected quantum kernel operator projects quantum states to an approximate classical representation, e.g., using reduced observables or classical shadows. The computed geometry is then fed to a classical method for training and verification. Even if the training set space has a large dimension, e.g., a dimension proportional to the number of qubits included in the available quantum computer, the projection provides a reduction to a low-dimensional classical space that can generalize better.

Figure 1:
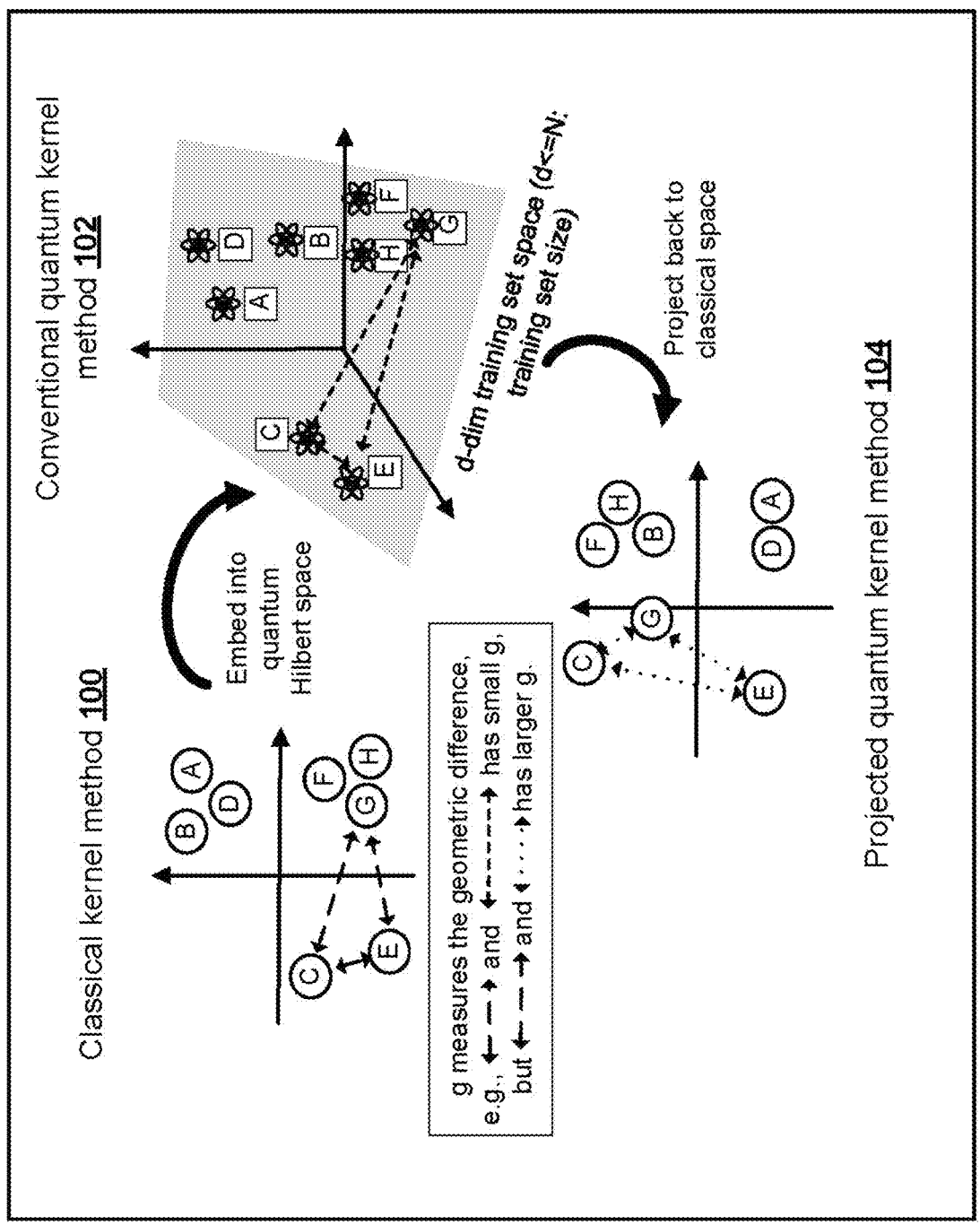
FIG. 1 is an illustration of kernel functions defined by classical kernel methods, conventional quantum kernel methods, and the projected quantum kernel method.

FIG. 1 is an illustration of the geometry (kernel function) defined by classical kernel methods 100, conventional quantum kernel methods 102 and the presently described projected quantum kernel method 104. The letters A, B, C, represent data points in different spaces with arrows representing the similarity measure (kernel function) between data. The geometric difference g is a difference between similarity measures in the different methods 100, 102, and 104 and d is an effective dimension of the data set in the quantum Hilbert space. As shown, the geometric difference between the similarity measures in the classical kernel method 100 and the projected quantum kernel method 104 is larger than the geometric difference between the similarity measures in the classical kernel method 100 and the conventional quantum kernel method 102. This larger geometric difference provides scalability and improved prediction accuracy, as discussed above.

Example Operating Environment

Figure 2:
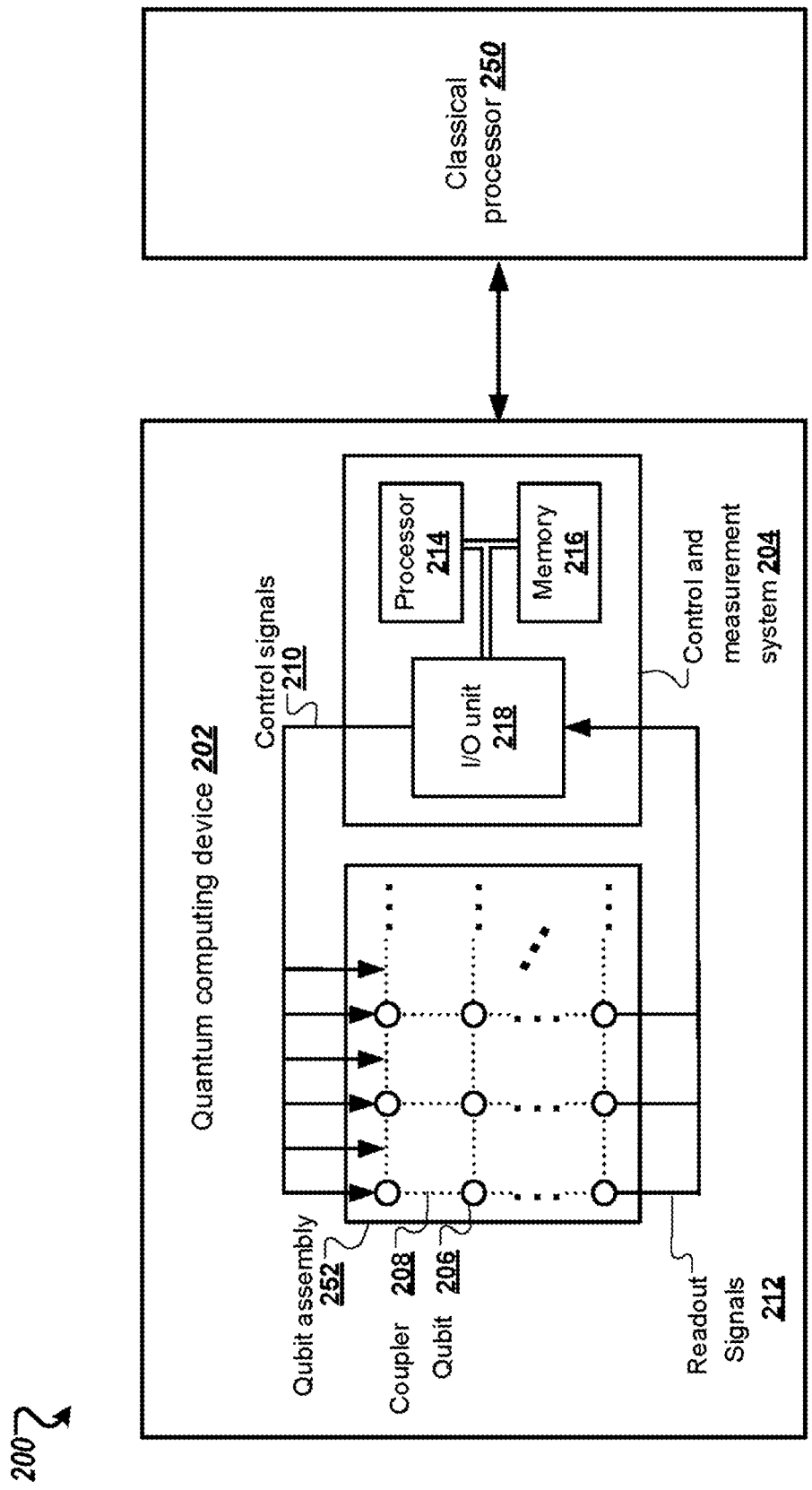
FIG. 2 shows a block diagram of an example system for performing classification and regression tasks using a projected quantum kernel method.

FIG. 2 depicts an example system 200 for performing classification and regression tasks using a projected quantum kernel method. The example system 200 is an example of a system implemented as classical and quantum computer programs on one or more classical computers and quantum computing devices in one or more locations, in which the systems, components, and techniques described below can be implemented.

The example system 200 includes an example quantum computing device 202. The quantum computing device 202 can be used to perform the quantum computation operations described in this specification according to some implementations. The quantum computing device 202 is intended to represent various forms of quantum computing devices. The components shown here, their connections and relationships, and their functions, are exemplary only, and do not limit implementations of the inventions described and/or claimed in this document.

The example quantum computing device 202 includes a qubit assembly 252 and a control and measurement system 204. The qubit assembly includes multiple qubits, e.g., qubit 206, that are used to perform algorithmic operations or quantum computations. While the qubits shown in FIG. 2 are arranged in a rectangular array, this is a schematic depiction and is not intended to be limiting. The qubit assembly 252 also includes adjustable coupling elements, e.g., coupler 208, that allow for interactions between coupled qubits. In the schematic depiction of FIG. 2, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device included in example system 200 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of unitary operators on the qubits. Applying a unitary operator to a quantum state can include applying a corresponding sequence of quantum logic gates to the qubits. Example quantum logic gates include single-qubit gates, e.g., Pauli-X, Pauli-Y, Pauli-Z (also referred to as X, Y, Z), Hadamard and S gates, two-qubit gates, e.g., controlled-X, controlled-Y, controlled-Z (also referred to as CX, CY, CZ), and gates involving three or more qubits, e.g., Toffoli gates. The quantum logic gates can be implemented by applying control signals 210 generated by the control and measurement system 204 to the qubits and to the couplers.

For example, in some implementations the qubits in the qubit assembly 252 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 210 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 210. The measurements cause readout signals 212 representing measurement results to be communicated back to the measurement and control system 204. The readout signals 212 may include RF, microwave, or optical signals depending on the physical scheme for the quantum computing device and/or the qubits. For convenience, the control signals 210 and readout signals 212 shown in FIG. 2 are depicted as addressing only selected elements of the qubit assembly (i.e. the top and bottom rows), but during operation the control signals 210 and readout signals 212 can address each element in the qubit assembly 252.

The control and measurement system 204 is an example of a classical computer system that can be used to perform various operations on the qubit assembly 252, as described above, as well as other classical subroutines or computations. The control and measurement system 204 includes one or more classical processors, e.g., classical processor 214, one or more memories, e.g., memory 216, and one or more I/O units, e.g., I/O unit 218, connected by one or more data buses. The control and measurement system 204 can be programmed to send sequences of control signals 210 to the qubit assembly, e.g. to carry out a selected series of quantum gate operations, and to receive sequences of readout signals 212 from the qubit assembly, e.g. as part of performing measurement operations.

The processor 214 is configured to process instructions for execution within the control and measurement system 204. In some implementations, the processor 214 is a single-threaded processor. In other implementations, the processor 214 is a multi-threaded processor. The processor 214 is capable of processing instructions stored in the memory 216.

The memory 216 stores information within the control and measurement system 204. In some implementations, the memory 216 includes a computer-readable medium, a volatile memory unit, and/or a non-volatile memory unit. In some cases, the memory 216 can include storage devices capable of providing mass storage for the system 204, e.g. a hard disk device, an optical disk device, a storage device that is shared over a network by multiple computing devices (e.g., a cloud storage device), and/or some other large capacity storage device.

The input/output device 218 provides input/output operations for the control and measurement system 204. The input/output device 218 can include D/A converters, A/D converters, and RF/microwave/optical signal generators, transmitters, and receivers, whereby to send control signals 210 to and receive readout signals 212 from the qubit assembly, as appropriate for the physical scheme for the quantum computer. In some implementations, the input/output device 218 can also include one or more network interface devices, e.g., an Ethernet card, a serial communication device, e.g., an RS-232 port, and/or a wireless interface device, e.g., an 802.11 card. In some implementations, the input/output device 218 can include driver devices configured to receive input data and send output data to other external devices, e.g., keyboard, printer and display devices.

Although an example control and measurement system 204 has been depicted in FIG. 2, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The example system 200 includes an example classical processor 250. The classical processor 250 can be used to perform classical computation operations described in this specification according to some implementations, e.g., the classical machine learning methods described herein.

Figure 3:
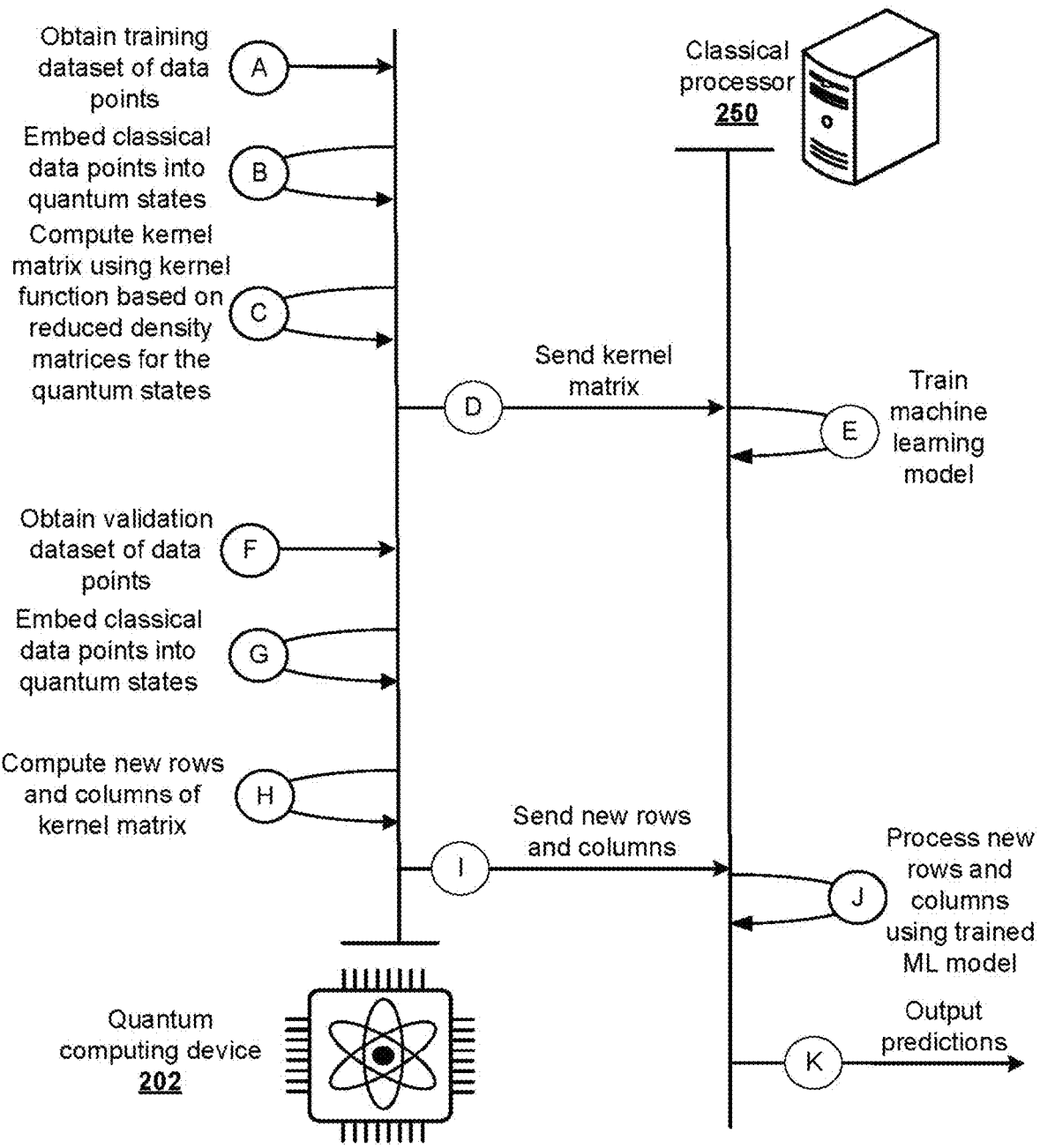
FIG. 3 shows a block diagram of an example process for performing classification and regression tasks using a projected quantum kernel method.

FIG. 3 shows a block diagram of example system 200 of FIG. 2 performing classification and regression tasks using a projected quantum kernel method. Stages (A)-(E) represent a training phase and correspond to steps 402-406 of example process 400 as described below with reference to FIG. 4. During stage (A) of the example process, the quantum computing device 202 obtains a training dataset of data points. In some implementations the data points can be quantum data points, e.g., quantum states. In other implementations the data points can be classical data points. In these implementations, during stage (B), the quantum computing device embeds the classical data points in respective quantum states. Stages (A) and (B) are described in more detail below with reference to step 402 of example process 400. In some implementations, the training dataset of data points may be received from a classical computer, such as classical processor 250. In other implementations, the training dataset of data points may be received from a quantum computing device, such as quantum computing device 202.

During stage (C), the quantum computing device 102 computes a kernel matrix using a kernel function that is based on reduced density matrices for the obtained quantum data points/states. Stage (C) is described in more detail below with reference to step 404 of example process 400.

During stage (D) the quantum computing device 202 sends the computed kernel matrix to the classical processor 250. During stage (E), the classical processor receives the kernel matrix and uses the kernel matrix to train a machine learning model.

Stages (F)-(K) represent a verification or inference phase and correspond to steps 408-412 of example process 400. During stage (F) the quantum computing device 202 obtains a validation dataset of data points. In some implementations the data points can be quantum data points, e.g., quantum states. In other implementations the data points can be classical data points. In these implementations, during stage (G), the quantum computing device embeds the classical data points in respective quantum states.

During stage (H) the quantum computing device updates the kernel matrix by computing new rows and columns corresponding to the data points in the validation dataset. Stage (H) is described in more detail below with reference to step 404 and 410 of example process 400.

During stage (I) the quantum computing device 202 sends the updated kernel matrix to the classical processor 250. During stage (J), the classical processor receives the updated kernel matrix and processes the updated kernel matrix using the trained machine learning model. During stage (K) the classical processor 250 outputs predictions corresponding to the data points in the validation dataset.

Programming the Hardware

Figure 4:
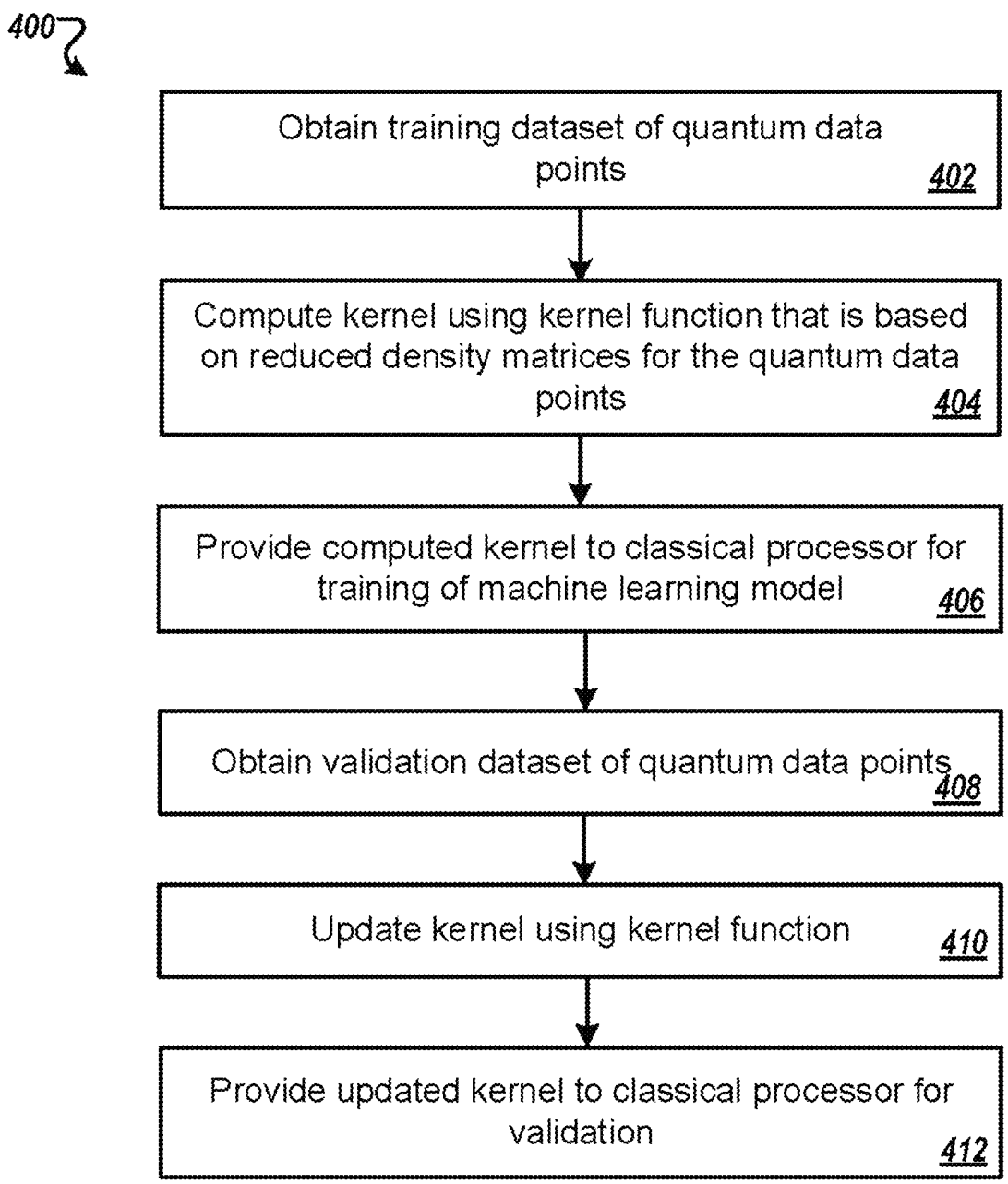
FIG. 4 is a flowchart of an example process for generating and updating a kernel matrix.

FIG. 4 is a flowchart of an example process 400 for generating and updating a kernel matrix. For convenience, the process 400 will be described as being performed by a system of one or more classical and quantum computing devices located in one or more locations. For example, the quantum computing device 100 of FIG. 1, appropriately programmed in accordance with this specification, can perform the process 400.

The quantum computing device obtains a training dataset of quantum data points (step 402). The data points can be unlabeled or assigned an associated categorical label or numerical value.

In some implementations the quantum computing device can receive the training dataset as a quantum data input. For example, the quantum computing device can receive a set of quantum states $|x_i\rangle$ or access the set of quantum states from a quantum memory included in the quantum computing device. Each quantum state $|x_i\rangle$ in the training dataset can be a respective state of an N-qubit quantum system. Each quantum state $|x\rangle$ can represent a respective classical data point, e.g., an image as described below.

In other implementations the quantum computing device can receive a training dataset of classical data points $\{x_i\}$ and generate a respective training dataset of quantum data points by embedding each classical data point $x_i$ into a respective quantum state $|x_i\rangle$. To embed a classical data point $x_i$ into an N-qubit quantum state $|x_i\rangle$, the quantum computing device can apply an encoding circuit $U_{enc}(x_i)$ to a reference quantum state of N-qubits, e.g., the state $|00 \ldots 0\rangle$. The encoding circuit $U_{enc}$ used to embed the classical data points into respective quantum states is dependent on the type of data included in the training dataset of classical data points, and various circuits can be used. For example, in cases where the classical data point represents an image, the encoding circuit can be defined as a circuit that rotates each of N-qubits by a respective scaled singular value of the image. In some cases more complex encoding circuits that include layers of rotations with entangling quantum gates between some of the layers can be used.

The quantum computing device performs multiple quantum computations to compute a kernel matrix Q that represents a similarity between the quantum data points included in the training dataset (step 404). Computing the kernel matrix includes computing a value of a kernel function $Q_{ij}=Q(x_i, x_j)$ for each pair of quantum data points $x_i, x_j$ in the training dataset. The kernel function $Q(x_i, x_j)$ is based on reduced density matrices for the quantum data points obtained at step 402. For example, in some implementations the kernel function can be based on single-body reduced density matrices (1-RDMs) for the quantum data points. In other implementations the kernel function can be based on k-body RDMs for the quantum data points, where k is less than a predetermined value. Example kernel functions are described below.

Linear Kernel Function Using 1-RDMs

In implementations where the kernel function is based on a set of 1-RDMs, the kernel function can be a linear kernel function. The linear kernel function takes a first quantum data point and second quantum data point as input and produces a numerical output. The linear kernel function can include a sum of terms, where the sum runs over each of the N-qubits. Each summand corresponds to a respective qubit and is equal to the trace of a product of i) a reduced density matrix for the first quantum data point on a subsystem corresponding to the respective qubit ii) a reduced density matrix for the second quantum data point on a subsystem corresponding to the respective qubit. For example, the linear kernel function can given by Equation (1) below.

$$Q(x_i, x_j) = \sum_l Tr[Tr_{m\neq l}[\rho(x_i)]][Tr_{n\neq l}[\rho(x_j)]]. \qquad (1)$$

In Equation (1), l is an index that runs from 1 to the number of qubits N and labels each qubit, $\rho(x_i)=|x_i\rangle\langle x_i|$ and $Tr_{m\neq k}[\rho(x_i)]$ represents a 1-RDM, e.g., a trace over all qubits except qubit k. The linear kernel function given by Equation (1) can learn any observable that can be written as a sum of one-body terms.

To compute a value of the linear kernel function given by Equation (1) for a pair of quantum data points that includes a first N-qubit quantum state and a second N-qubit quantum state, the quantum computing device can:

Repeatedly and for each qubit index l=1, ..., N:
  Compute a 1-RDM for the first N-qubit quantum state on a subsystem corresponding to qubit l, e.g., compute $Tr_{m\neq k}[\rho(x_i)]$, by obtaining or preparing a copy of the first N-qubit quantum state, e.g., obtain or prepare a copy of an N-qubit quantum system in the first N-qubit quantum state, and measuring each qubit in the quantum system except the l-th qubit to obtain a classical representation, e.g., 2 by 2 matrix, of a first reduced quantum state of the quantum system,
  Compute a 1-RDM for the second N-qubit quantum state on a subsystem corresponding to qubit l, e.g., compute $Tr_{m\neq k}[\rho(x_j)]$, by obtaining or preparing a copy of the second N-qubit quantum state, e.g., obtain or prepare a copy of an N-qubit quantum system in the second N-qubit quantum state, and measuring each qubit in the quantum system except the l-th qubit to obtain a classical representation, e.g., 2 by 2 matrix, of a second reduced quantum state of the quantum system, and
  Perform classical operations according to Equation (1) (e.g., multiplying classical representations of the first reduced quantum state and second reduced quantum state, computing traces of multiplied values, and summing averages of computed traces for each qubit index l=1, ..., N) to obtain a numerical value for $Q(x_i, x_j)$.

To compute the complete kernel matrix, the quantum computing device repeats the above described procedure for each pair of quantum data points $x_i, x_j$ in the training dataset.

Squared Exponential Kernel Function Using 1-RDMs

As another example, in implementations where the kernel function is based on a set of 1-RDMs, the kernel function can be a squared exponential kernel function. The squared exponential kernel function takes a first quantum data point and second quantum data point as input and produces a numerical output. The squared exponential kernel function can include an exponential function of a sum of terms, wherein the sum runs over each of N-qubits. Each summand corresponds to a respective qubit and is equal to norm of i) a reduced density matrix for the first quantum data point on a subsystem corresponding to the respective qubit minus ii) a reduced density matrix for the second quantum data point on a subsystem corresponding to the respective qubit. For example, the squared exponential kernel function can be given by Equation (2) below.

$$Q_E^1(x_i, x_j) = \exp(-\gamma \Sigma_l \| Tr_{m\neq l}[\rho(x_i)] - Tr_{n\neq l}[\rho(x_j)] \|^2). \qquad (2)$$

In Equation (2), γ represents a tunable parameter that can be adjusted to improve prediction accuracy (γ can be used to define how close points $x_i$ and $x_j$ should be using the RDMs, if γ is large then most points will have a similarity close to zero, whereas if γ is small then points with similar RDMs are considered to have high similarity. If γ is zero, each point can be considered the same,) l is an index that runs from 1 to the number of qubits N and labels each qubit, $\rho(x_i)=|x_i\rangle\langle x_i|$ and $Tr_{m\neq k}[\rho(x_i)]$ represents a 1-RDM. The squared exponential kernel function given by Equation (2) can learn any non-linear function of the 1-RDMs.

To compute a value of the squared exponential kernel function given by Equation (2) for a pair of quantum data points that includes a first N-qubit quantum state and a second N-qubit quantum state, the quantum computing device can:

Repeatedly and for each qubit index l=1, ..., N:
  Compute a 1-RDM for the first N-qubit quantum state on a subsystem corresponding to qubit l, e.g., compute $Tr_{m\neq l}[\rho(x_i)]$, by obtaining or preparing a copy of the first N-qubit quantum state, e.g., obtain or prepare a copy of an N-qubit quantum system in the first N-qubit quantum state, and measuring each qubit in the quantum system except the l-th qubit to obtain a (classical representation of a) first reduced quantum state of the quantum system,
  Compute a 1-RDM for the second N-qubit quantum state on a subsystem corresponding to qubit l, e.g., compute $Tr_{m\neq l}[\rho(x_j)]$, by obtaining or preparing a copy of the second N-qubit quantum state, e.g., obtain or prepare a copy of an N-qubit quantum system in the second N-qubit quantum state, and measuring each qubit in the quantum system except the l-th qubit to obtain a (classical representation of a second reduced quantum state) of the quantum system,
  Subtract the second reduced quantum state from the first reduced quantum state to obtain a third reduced quantum state and determine a norm of the third reduced quantum state, e.g., classically compute $\|Tr_{m\neq l}[\rho(x_i)] - Tr_{n\neq l}[\rho(x_j)]\|^2$, and Sum averages of the determined norms for each qubit index l=1, . . . , N, multiply by $-\gamma$ and compute the exponent to obtain a value for $Q_E^1(x_i, x_j)$.

To compute the complete kernel matrix, the quantum computing device repeats the above described procedure for each pair of quantum data points $x_i$, $x_j$ in the training dataset.

Linear Kernel Function Using k-RDMs

As another example, in implementations where the kernel function is based on a set of k-RDMs, the kernel function can be a linear kernel function. The linear kernel function takes a first quantum data point and second quantum data point as input and produces a numerical output. The linear kernel function can include a sum of terms, where the sum runs over each subset of k-qubits taken from the N qubits. Each summand corresponds to a respective subset and is equal to the trace of a product of i) a reduced density matrix for the first quantum data point on a subsystem corresponding to the respective subset of k qubits and ii) a reduced density matrix for the second quantum data point on a subsystem corresponding to the respective subset of k qubits. For example, the linear kernel function can be given by Equation (3) below.

$$Q_L^k(x_i, x_j) = \Sigma_{K \in S_k(n)} Tr[Tr_{m \notin K}[\rho(x_i)]][Tr_{n \notin K}[\rho(x_j)]]. \quad (3)$$

In Equation (3), $S_k(n)$ represents a set of subsets of k qubits (taken from the N qubits), $\rho(x_i)=|x_i\rangle\langle x_i|$ and $Tr_{m\neq K}[\rho(x_i)]$ represents a k-RDM, e.g., a trace over all qubits except the k qubits included in the set K. The linear kernel function of Equation (3) can learn any observable that can be written as a sum of k-body terms.

To compute a value of the linear kernel function given by Equation (3) for a pair of quantum data points that includes a first N-qubit quantum state and a second N-qubit quantum state, the quantum computing device can:

Repeatedly and for each set K of k-qubits:
Compute a k-RDM for the first N-qubit quantum state on a subsystem corresponding to qubits in the set K, e.g., compute $Tr_{m\neq K}[\rho(x_i)]$, by obtaining or preparing a copy of the first N-qubit quantum state, e.g., obtain or prepare a copy of an N-qubit quantum system in the first N-qubit quantum state, and measuring each qubit in the quantum system except for the qubits included in the set K to obtain a (classical representation, e.g., matrix representation, of a) first reduced quantum state of the quantum system, Compute a k-RDM for the second N-qubit quantum state on a subsystem corresponding to qubits in the set K, e.g., compute $Tr_{m\neq K}[\rho(x_j)]$, by obtaining or preparing a copy of the second N-qubit quantum state, e.g., obtain or prepare a copy of an N-qubit quantum system in the second N-qubit quantum state, and measuring each qubit in the quantum system except for the qubits included in the set K to obtain a (classical representation of a) second reduced quantum state of the quantum system, Determine a trace of the product of the first reduced quantum state and the second reduced quantum state, e.g., determine $Tr[Tr_{m\neq K}[\rho(x_i)]][Tr_{n\neq K}[\rho(x_j)]]$, and Sum averages of the determined traces for each set K of k qubits to obtain a numerical value for $Q_L^k(x_i, x_j)$.

To compute the complete kernel matrix, the quantum computing device repeats the above described procedure for each pair of quantum data points $x_i$, $x_j$ in the training dataset.

Exponential Kernel Function Using k-RDMs

The kernel functions given by Equations (1)-(3) can learn a limited class of functions, e.g., the linear kernel function given by Equation (1) can learn observables that are a sum of single-qubit observables. However, in some implementations it can be beneficial to define a kernel that can learn any quantum models, e.g., arbitrarily deep quantum neural networks given by a linear function $f(x)=Tr(OU\rho(x)U\dagger)$ of a full quantum state. In these implementations the kernel function can be an exponential kernel function that uses k-RDMs sampled using classical shadows techniques. A k-RDM of a quantum state $\rho(x)$ for qubit indices $(p_1, p_2, \ldots p_k)$ can be reconstructed by local randomized measurements using the formalism of classical shadows:

$$\rho^{(p_1, p_2, \ldots p_k)}(x) = \mathbb{E}[\otimes_{r=1}^k (3|s_{p_r}, b_{p_r}\rangle \langle s_{p_r}, b_{p_r}| - I)]$$

where $b_{p_r}$ is a random Pauli measurement basis X, Y, Z on the $p_r$-th qubit and $s_{p_r}$ is the measurement outcome $\pm 1$ on the $p_r$-th qubit of the quantum state $\rho(x)$ under Pauli basis $b_{p_r}$. The expectation is taken with respect to the randomized measurement on $\rho(x)$. The inner product of two k-RDMs is equal to $$Tr[\rho^{(p_1, p_2, \ldots p_k)}(x_i)\rho^{(p_1, p_2, \ldots p_k)}(x_j)] = \mathbb{E}\left[\prod_{r=1}^k \left(9\delta_{s_{p_r}^i, s_{p_r}^j} \delta_{b_{p_r}^i, b_{p_r}^j} - 4\right)\right]$$

where the randomized measurement outcomes for $\rho(x_i)$, $\rho(x_j)$ are independent. This equation can be extended to the case where some indices $p_r$, $p_s$ coincide. This introduces additional features in the feature map that defines the kernel. The sum of all possible k-RDMs can be written as $$\sum_{p_1=1}^n \ldots \sum_{p_k=1}^n Tr[\rho^{(p_1, p_2, \ldots p_k)}(x_i)\rho^{(p_1, p_2, \ldots p_k)}(x_j)] =$$

$$\mathbb{E}\left[\left(\sum_{p=1}^n \left(9\delta_{s_p^i, s_p^j} \delta_{b_p^i, b_p^j} - 4\right)\right)^k\right]$$

where the equation for the inner product of two k-RDMs and the linearity of expectation is used. The kernel function that contains all orders of RDMs is therefore given by Equation (4) below.

$$Q_s(x_i, x_j) = \sum_{k=0}^\infty \frac{\gamma^k}{k! n^k} Q_L^k(x_i, x_j) = \mathbb{E} \exp\left(\frac{\gamma}{N}\sum_{p=1}^n \left(9\delta_{s_p^i, s_p^j} \delta_{b_p^i, b_p^j} - 4\right)\right). \quad (4)$$

In Equation (4), the expected value $\mathbb{E}$ is taken over $n_s$ samples from randomly chosen Pauli frames that are measured on system i and j, $$\delta_{s_p^i, s_p^j}$$

represents a first indicator function for the agreement between a random Pauli measurement result performed independently on system i and system j and $\delta_{b_p^i b_p^j}$ represents a second indicator function for the measurement basis agreement, e.g., whether the same basis X, Y, Z, I across each of the qubits between the two systems was chosen. γ represents a hyper-parameter.

To compute a value of the linear kernel function given by Equation (4) for a pair of quantum data points that includes a first N-qubit quantum state and a second N-qubit quantum state, the quantum computing device can:

For a k-th repetition of $n_s$ samples:
 Obtain a first measurement result by measuring each qubit in system i in a randomly sampled Pauli basis, X, Y, or Z to obtain $s_h^i$ and $b_h^i$ for the h-th qubit, where $s_h^i$ is either 1 or −1 and $b_h^i$ is a random basis X, Y, or Z,
 Obtain a second measurement result by measuring each qubit in system j in a randomly sampled Pauli basis, X, Y, or Z to obtain $s_h^j$ and $b_h^j$ for the h-th qubit, where $s_h^j$ is either 1 or −1 and $b_h^j$ is a random basis X, Y, or Z,
 For the h-th qubit in the n qubit system, compare the first measurement results and second measurement results to determine a value of the first indicator function $\delta_{s_h^i s_h^j}$, winch is equal to one if the two outcomes $s_h^i$, $s_h^j$ are equal, otherwise equal to zero,
 For the h-th qubit in the n qubit system, determine a value of the second indicator function by $\delta_{b_h^i b_h^j}$, Compute the value $$A_k = \exp\left(\frac{\gamma}{N} \sum_{p=1}^{n} \left(9 \delta_{s_h^i s_h^j} \delta_{b_h^i b_h^j} - 4\right)\right)$$

for tunable γ>0, and
Estimate the kernel function using $$Q_s(x_i x_j) \approx \frac{1}{n_s} \sum_{k=1}^{n} A_k.$$

Mathematically, the quantity $$\frac{1}{N_s(N_s-1)} \sum_{r_1=1}^{N_s} \sum_{r_2=1, r_2 \neq r_1}^{N_s} \exp\left(\frac{\gamma}{2} \sum_{p=1}^{n} \left(9 \delta_{s_p^{i,r_1} s_h^{j,r_2}} \delta_{b_p^{i,r_1} b_p^{j,r_2}} - 4\right)\right) \approx Qs(x_i x_j)$$

is computed, where $N_s$ represents the number of repetitions for each quantum state of system i or j, $r_1$ and $r_2$ are repetitions, $b_p^{j,r_2}$ represents the Pauli basis in the p-th qubit for the $r_2$ repetition, and $s_p^{j,r_2}$ is the corresponding measurement outcome. Computing this kernel function using local randomized measurements and the formalism of classical shadows is efficient since the classical shadow formalism allows efficient construction of RDMs from few measurements.

To compute the complete kernel matrix, the quantum computing device repeats the above described procedure for each pair of quantum data points $x_i$, $x_j$ in the training dataset.

Returning to FIG. 4, the quantum computing device provides the computed kernel matrix Q to a classical processor (step 406). The classical processor is configured to perform a classical machine learning method using the kernel matrix Q. For example, in implementations where the training data points obtained at step 402 is labeled data, the classical processor can be configured to perform any kernel SVM method used for classification or prediction, including Gaussian kernels, neural tangent kernels, random forests. As another example, in implementations where the training obtained at step 402 is unlabeled data, the classical processor can be configured to use the computed kernel matrix to endow the space with a distance metric that can be used to perform unsupervised learning or classification using an algorithm such as k-means.

The classical processor performs a training algorithm using the received kernel matrix to train a corresponding machine learning model. The particular training algorithm performed by the classical processor is dependent on the type of machine learning method the classical processor is configured to perform and can include various training algorithms.

The quantum computing device obtains a validation dataset of quantum data points $\{y_i\}$ (step 408). As described above with reference to step 402, the quantum data points included in the validation dataset can be received as a quantum data input or can be generated based on a classical data input.

The quantum computing device performs multiple quantum computations to update the kernel matrix by computing new rows and columns of the kernel matrix (step 410). The new rows and columns represent similarities between the quantum data points in the validation dataset and quantum data points in the training dataset. Computing the new rows and columns of the kernel matrix includes computing values of the previously used kernel function $Q_{ij}=Q(x_i, x_j)$ for each pair of quantum data points $x_i$, $y_j$ in the training dataset and validation dataset, as described above with reference to step 404.

The quantum computing device provides the updated kernel matrix, e.g., the new rows and columns of the kernel matrix, to the classical processor (step 412). The classical processor processes the updated kernel matrix to output predictions, e.g., assign a label or numerical value, for each quantum data point in the validation dataset.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    obtaining, by a quantum computing device, a training dataset of quantum data points;
    computing, by the quantum computing device, a kernel matrix that represents similarities among the quantum data points included in the training dataset, wherein the quantum data points are encoded as quantum states of qubits by the quantum computing device, comprising computing, for each pair of quantum data points in the training dataset, a corresponding value of a kernel function, wherein the kernel function is based on reduced density matrices for the quantum data points, wherein the kernel function takes a first and a second quantum data points as input and computes a similarity between the first and the second quantum data points as an element in the kernel matrix, and wherein the reduced density matrices are computed for quantum states of a subset of qubits; and
    providing, by the quantum computing device, the kernel matrix to a classical processor.

2. The method of claim 1, further comprising:
    receiving, from the quantum computing device and by the classical processor, the kernel matrix; and
    performing, by the classical processor, a training algorithm using the kernel matrix to construct a machine learning model.

3. The method of claim 1, further comprising:
    obtaining, by the quantum computing device, a validation dataset of quantum data points;
    computing, by the quantum computing device, new elements of the kernel matrix, wherein the new elements comprise entries representing similarities between the quantum data points in the validation dataset and the quantum data points in the training dataset, wherein the quantum data points in the validation dataset are encoded as quantum states of qubits by the quantum computing device and computing the new elements comprises computing, for each pair of quantum data points in the training dataset and the validation dataset, corresponding values of the kernel function; and
    providing, by the quantum computing device, the new elements of the kernel matrix to the classical processor.

4. The method of claim 3, further comprising processing, by the classical processor, the new elements of the kernel matrix to output predictions for each quantum data point in the validation dataset.

5. The method of claim 1, wherein the kernel function is based on single-body reduced density matrices for the quantum data points in the training dataset.

6. The method of claim 5, wherein the kernel function comprises a linear kernel function.

7. The method of claim 6, wherein the linear kernel function i) takes a first quantum data point and second quantum data point as input, ii) produces a numerical output, and iii) includes a sum of terms, wherein the sum runs over each of N-qubits for $N>1$ and the summand corresponds to a respective qubit and is equal to the trace of a product of a) a reduced density matrix for the first quantum data point on a subsystem corresponding to the respective qubit b) a reduced density matrix for the second quantum data point on a subsystem corresponding to the respective qubit.

8. The method of claim 6, wherein the linear kernel function is given by $$Q(x_i, x_j) = \sum_l Tr[Tr_{m \neq l}[\rho(x_i)]][Tr_{n \neq l}[\rho(x_j)]]$$

where $x_i$, $x_j$ represent a first and second quantum data point, l represents an index that runs from 1 to the number of qubits N and labels each qubit, $\rho(x_i) = |x_i\rangle\langle x_i|$ and $Tr_{m \neq k}[\rho(x_i)]$ represents a 1-reduced density matrix (RDM) on qubit k.

9. The method of claim 6, wherein computing a value of the kernel function for a pair of quantum data points in the training dataset, the pair comprising a first N-qubit quantum state wirth N>1 and a second N-qubit quantum state with N>1, comprises:
  repeatedly and for each qubit index:
    computing a 1-reduced density matrix (RDM) for the first N-qubit quantum state on a subsystem corresponding to qubit l, comprising obtaining a copy of an N-qubit quantum system in the first N-qubit quantum state and measuring each qubit in the quantum system except the l-th qubit to obtain a first reduced quantum state of the quantum system;
    computing a 1-RDM for the second N-qubit quantum state on a subsystem corresponding to qubit l, comprising obtaining a copy of an N-qubit quantum system in the second N-qubit quantum state and measuring each qubit in the quantum system except the l-th qubit to obtain a second reduced quantum state of the quantum system;
    determining a trace of the product of the first reduced quantum state and the second reduced quantum state; and
    summing averages of the determined traces for each qubit index.

10. The method of claim 5, wherein the kernel function comprises a squared exponential kernel function.

11. The method of claim 10, wherein the squared exponential kernel function i) takes a first quantum data point and second quantum data point as input, ii) produces a numerical output, and iii) includes an exponential function of a sum of terms, wherein the sum runs over each of N-qubits for N>1 and the summand corresponds to a respective qubit and is equal to norm of a) a reduced density matrix for the first quantum data point on a subsystem corresponding to the respective qubit minus b) a reduced density matrix for the second quantum data point on a subsystem corresponding to the respective qubit.

12. The method of claim 10, wherein the squared exponential kernel function is given by $$Q_E^{\frac{1}{2}}(x_i, x_j) = \exp\left(-\gamma \sum_l \|Tr_{m \neq l}[\rho(x_i)] - Tr_{n \neq l}[\rho(x_j)]\|^2\right)$$

where $x_i$, $x_j$ represent a first and second quantum data point, l represents an index that runs from 1 to the number of qubits N and labels each qubit, $\rho(x_i) = |x_i\rangle\langle x_i|$ and $Tr_{m \neq k}[\rho(x_i)]$ represents a 1-RDM on qubit k.

13. The method of claim 10, wherein computing a value of the kernel function for a pair of quantum data points in the training dataset, the pair comprising a first N-qubit quantum state with N>1 and a second N-qubit quantum state with N>1, comprises, repeatedly and for each qubit index:
  computing a 1-reduced density matrix (RDM) for the first N-qubit quantum state on a subsystem corresponding to qubit l, comprising obtaining a copy of an N-qubit quantum system in the first N-qubit quantum state and measuring each qubit in the quantum system except the l-th qubit to obtain a first reduced quantum state of the quantum system;
  computing a 1-RDM for the second N-qubit quantum state on a subsystem corresponding to qubit l, comprising obtaining a copy of an N-qubit quantum system in the second N-qubit quantum state and measuring each qubit in the quantum system except the l-th qubit to obtain a second reduced quantum state of the quantum system;
  subtracting the second reduced quantum state from the first reduced quantum state to obtain a third reduced quantum state and determining a norm of the third reduced quantum state; and
  summing averages of the determined norms for each qubit index and computing an exponent of the summed averages.

14. The method of claim 1, wherein the kernel function is based on k-body RDMs for the quantum data points, wherein k is less than a predetermined value.

15. The method of claim 14, wherein the kernel function comprises a linear kernel function.

16. The method of claim 15, wherein the linear kernel function i) takes a first quantum data point and second quantum data point as input, ii) produces a numerical output, and iii) comprises a sum of terms, wherein the sum runs over each subset of k-qubits taken from the N qubits and each summand corresponds to a respective subset and is equal to the trace of a product of a) a reduced density matrix for the first quantum data point on a subsystem corresponding to the respective subset of k qubits and b) a reduced density matrix for the second quantum data point on a subsystem corresponding to the respective subset of k qubits.

17. The method of claim 15, wherein the linear kernel function is given by $$Q_L^k(x_i, x_j) = \sum_{K \in S_k(n)} Tr[Tr_{m \notin K}[\rho(x_i)]][Tr_{n \notin K}[\rho(x_j)]]$$

where $S_k(n)$ represents a set of subsets of k qubits, $\rho(x_i) = |x_i\rangle\langle x_i|$ and $Tr_{m \neq K}[\rho(x_i)]$ represents a k-RDM.

18. The method claim 15, wherein computing a value of the kernel function for a pair of quantum data points in the training dataset, the pair comprising a first N-qubit quantum state and a second N-qubit quantum state, comprises:
  repeatedly and for each set of k-qubits:
    computing a k-RDM for the first N-qubit quantum state on a subsystem corresponding to qubits in the set, comprising obtaining a copy of an N-qubit quantum system in the first N-qubit quantum state and measuring each qubit in the quantum system except for the qubits included in the set to obtain a first reduced quantum state of the quantum system;
    computing a k-RDM for the second N-qubit quantum state on a subsystem corresponding to qubits in the set, comprising obtaining a copy of an N-qubit quantum system in the second N-qubit quantum state and measuring each qubit in the quantum system except for the qubits included in the set to obtain a second reduced quantum state of the quantum system;

determining a trace of the product of the first reduced quantum state and the second reduced quantum state; and summing averages of the determined for each set of k qubits.

19. The method of claim 14, wherein the kernel function comprises an exponential kernel function.

20. The method of claim 19, wherein the exponential kernel function is given by $$Q_s(x_i, x_j) = \sum_{k=0}^{\infty} \frac{\gamma^k}{k! n^k} Q_l^k(x_i, x_j) = \mathbb{E}\exp\left(\frac{\gamma}{N}\sum_{h=1}^{n}\left(9\delta_{s_h^i s_h^j}\delta_{b_h^i b_h^j} - 4\right)\right)$$

where the expected value E is taken over $n_s$ samples from randomly chosen Pauli frames that are measured on a first and second system i and j, $$\delta_{s_h^i s_h^j}$$

represents a first indicator function for an agreement between a random Pauli measurement result performed independently on the first system i and the second system j and $$\delta_{b_h^i b_h^j}$$

represents a second indicator function for a measurement basis agreement.

21. The method of claim 20, wherein computing a value of the kernel function for a pair of quantum data points in the training dataset, the pair comprising a first N-qubit quantum state and a second N-qubit quantum state, comprises repeatedly:

obtaining a first measurement result, comprising measuring each qubit in the first system in a random Pauli basis to obtain values $s_h^i$ and $b_h^i$ for the h-th qubit, wherein $s_h^i$ is either 1 or −1 and by is a random basis X, Y, or Z;

obtaining a second measurement result, comprising measuring each qubit in the second system in a random Pauli basis to obtain values $s_h^j$ and $b_h^j$ for the h-th qubit, wherein $s_h^j$ is either 1 or −1 and $b_h^j$ is a random basis X, Y, or Z;

comparing, for the h-th qubit in the N qubit system, the first measurement result and second measurement result to determine a value of the first indicator function;

determining, for the h-th qubit in the N qubit system, a value of the second indicator function; and multiplying, summing and averaging the determined values of the first indicator function and the second indicator function.

22. The method of claim 1, wherein the quantum data points comprise N-qubit quantum states with N>1.

23. The method of claim 1, wherein obtaining the training dataset of quantum data points comprises:

receiving a training dataset of classical data points; and generating the training dataset of quantum data points, comprising embedding each classical data point in a respective quantum state by applying a respective encoding circuit to a reference quantum state.

24. An apparatus comprising:

one or more classical processors; and one or more quantum computing devices in data communication with the one or more classical processors, wherein the quantum computing hardware comprises:

one or more qubit registers, each qubit register comprising one or more qubits, and a plurality of control devices configured to operate the one or more qubit registers;

wherein the apparatus is configured to perform operations comprising:

obtaining, by a quantum computing device, a training dataset of quantum data points;

computing, by the quantum computing device, a kernel matrix that represents similarities among the quantum data points included in the training dataset, wherein the quantum data points are encoded as quantum states of qubits by the quantum computing device, comprising computing, for each pair of quantum data points in the training dataset, a corresponding value of a kernel function, wherein the kernel function is based on reduced density matrices for the quantum data points, wherein the kernel function takes a first and a second quantum data points as input and computes a similarity between the first and the second quantum data points as an element in the kernel matrix, and wherein the reduced density matrices are computed for quantum states of a subset of qubits; and providing, by the quantum computing device, the kernel matrix to a classical processor.

* * * * *